Patented June 2, 1936

2,043,029

UNITED STATES PATENT OFFICE 2,043,029

FURNACE LINING AND MATERIAL THEREFOR

Henry H. Blau, Charleroi, Pa., and Henry N. Baumann, Jr., Niagara Falls, N. Y., assignors to The Carborundum Company, Niagara Falls, N. Y., a corporation of Pennsylvania No Drawing. Application April 19, 1934, Serial No. 721,354

10 Claims. (Cl. 49—79)

This invention relates to glass tanks and other furnaces where the upkeep of the lining is a problem due to corrosion from the molten contents, such as glass or corrosive liquid slags, or certain vapors of a corrosive nature. More particularly, this invention relates to refractories which we have found to be exceptionally resistant to corrosion when employed in the construction of glass or other such furnaces where like problems are encountered.

In the operation of glass tanks and certain other furnaces, the refractories are subjected to destructive conditions due both to the temperatures involved and to the corrosive contents. Destruction of the refractory furnace lining is often particularly rapid due to exposure to fumes containing a considerable proportion of sodium oxide and/or other alkalies. Many attempts have been made to find suitable materials for the construction of such furnaces. If the corrosive materials are alkaline only, a basic furnace lining, such as magnesite may sometimes be used with a fair degree of success. The ingredients used in many cases are not all alkaline, however. In glass melting tanks, for instance, other materials, including silica, are present which have a distinctly acid reaction, resulting in the too rapid failure of basic refractories used in the construction of the tank walls and roofs.

In an effort to secure better performance where the furnace lining is subjected to the corrosive action of both alkaline and other materials, we have attempted to build furnaces of bonded alumina refractories either in the form of crystalline or amorphous material. We have found however that such refractory material is rapidly altered in such installations, the alteration frequently being accompanied by marked swelling and disintegration of the refractory.

We have discovered that such disintegration is greatly retarded and the swelling substantially eliminated if the furnace parts subjected to the above-mentioned corrosive action are made of the peculiar type of alumina known mineralogically as "beta alumina". Inasmuch as there is, to our knowledge, no natural source of this type of alumina, it is necessary that it be manufactured synthetically as, for instance, by fusing relatively pure amorphous or alpha alumina with from 1 to 10% of sodium oxide or with a small percentage of magnesium or barium oxide, the amount of the addition depending upon the impurities present and the degree of conversion desired.

When pure alumina is fused and then solidified, a variety known as the alpha modification ordinarily results, which is dense and solid and crystallizes either in the rhombohedral division of the hexagonal system or occasionally in hexagonal basal plates. On the other hand, if relatively pure alumina containing a small amount of a compound or compounds of sodium or potassium is similarly fu d and solidified, the resulting material consists in part of the so-called beta-modification. This crystallizes in the hexagonal division of the hexagonal system and has a lower specific gravity, being about 3.30 against approximately 4.0 for the more common modification. This material is distinguishable from alpha alumina not only by its specific gravity, but it may also be readily identified by optical means through its index of refraction, the index of refraction of alpha alumina being about 1.76 and that for beta alumina being about 1.63 to 1.68.

The proportion of beta alumina present varies in general with the proportion of soda, etc. added, 5% of soda added to pure alumina resulting in its substantially complete conversion to the beta form. Complete conversion of the alumina to the beta form is not essential, but it is desirable that a major proportion of it should be in that form. While the proportion of beta alumina which is formed is generally dependent upon the amount of soda or magnesia added, the efficacy of the latter is greatly reduced by the simultaneous presence of silica or titania in the melt, so that when such impurities are present it may be advisable to add a considerably larger percent of soda or magnesia than when they are absent.

It has been found that alumina, made by the Bayer process, the essential feature of which is the precipitation of $Al_2O_3$ from a sodium aluminate solution, is a very satisfactory raw material. It is not necessary to resort to elaborate washing processes to remove the sodium compounds from the alumina product in this material for, as previously stated, such compounds must actually be added to the raw batch for the production of beta-alumina.

While there are obvious advantages to using pure alumina as the raw material, the presence of a small amount of impurities (bearing in mind the necessity of adding excess soda if silica or titania are present, as has been shown above) is not always objectionable, so long as a major proportion of beta alumina is obtained.

Usually soda ash is used as a source of the required alkali because it is generally the cheapest material figured on the basis of its $Na_2O$ content; but we by no means limit ourselves to this compound. The amount of soda ash may vary within considerable limits, as previously stated; but we have found in the case of a relatively pure alumina that adding a sufficient quantity to give about 5% Na₂O in the raw batch, will bring about the desired effects.

In the production of refractories for our purpose, the ingredients of the raw batch are well mixed; and then the fusion is carried out in a furnace similar to that commonly used for the production of fused alumina for abrasive purposes generally consisting of a water cooled iron shell without any lining other than that built up by the material being fused as it is fed into the furnace. Fusion is effected initially by the heat from an electric arc between two or more electrodes inserted in the iron shell but after a bath of molten material is formed the resistance of this fused material to the passage of electric current through it is used to supply heat. The material is fed in gradually, and the electrodes raised as the fused mass is built up. The furnace technique is quite similar to that employed in making aluminous abrasives. Economy in the use of soda and improved operating conditions can be obtained if the soda, instead of being admixed uniformly with the entire charge of raw material, is admixed in larger proportion with a special charge of raw material which is added to the furnace after fusion of the main bulk has been completed. In this way, the volatilization of soda is cut down and the cost of this material reduced. Also working conditions around the furnace are thus greatly improved by elimination of the acrid fumes to as great an extent as possible.

When the material has arrived at the proper temperature and the correct degree of fluidity, it may be poured into molds of the desired shape and size. The furnace may be adapted either for tapping the molten material out through its side, or it may be arranged to be tilted so as to pour the material into the mold. Particularly in the latter case, it is desirable that provision be made to prevent molten material spilling into the water cooling system. This may be accomplished by the use of an iron apron properly positioned.

The molds may be of granular refractory material bonded with a core binder such as is commonly used in foundry practice, or may be made of preburned refractory material, of carbon, or of a suitable metal. The molded articles may be of practically any shape or size, provided the walls are not too thin and provided suitable precautions are taken in fabricating the molds and in pouring the fused batch. These molds may be preheated if desired, and may be insulated to prevent too rapid loss of heat, by embedding them in a molding flask in which they are surrounded by sand or other heat insulating material.

They should be provided with risers of ample size to permit complete filling of the mold without interference by material freezing in the headers. Moreover, the headers should be of sufficient size to allow for the contraction of the molten material as it solidifies. If the riser is made wedge shaped with its minimum section immediately adjoining the mold, removal of the excess material constituting a header is facilitated.

After a mold is filled it is moved away and additional molds also filled successively.

Instead of pouring the molten refractory material into molds, it is also possible to utilize the furnace itself as a mold, in which case it is desirable to line it with a very light coating of refractory material so that the molten material may extend out to the edges to form a smooth block. Charging is carried on just as before, the electrodes being gradually withdrawn and a block built up to the desired thickness. This method of molding has the disadvantage that only one mold can be filled at a time, but this is compensated for by the fact that practically no material is lost in headers, etc. as in the other type of mold. It is sometimes desirable to provide furnace molds of this type with a small dimensional draft to facilitate removal of the piece from the mold although due to the considerable shrinkage of the piece after solidification this is in general unnecessary.

The molded pieces may be left in the mold for heat treatment; or, in the case of iron molds particularly, the pieces may be taken from the molds shortly after the outer walls of the casting have solidified and then cooled without other than their own support. The headers should be removed from the castings at this point by sledging, as the castings are tougher at this stage than when cold and there is less danger of their being cracked by the hammering. With a header tapering to a smaller sectional area next the casting, removal in this manner is usually simple and fairly clean.

Considerably less care is required in the annealing of refractory pieces made in accordance with our invention than has been necessary with refractories made of alpha alumina, and the time required to carry out the annealing process is distinctly shorter.

After the pieces are cold any objectionable remainder of the header or other minor protuberances may be removed by chipping, or in minor cases by grinding.

We have found that refractory castings having a major content of beta alumina are easier to handle than castings of alpha alumina for several reasons. In the first place the melt is distinctly less viscous and easier to pour than a fusion of alumina made in the conventional way. The material in the fused state appears to be more fluid and assumes the shape of the mold more easily, giving superior castings. Its melting point is not however lowered below that of alpha alumina to an extent which decreases its utility for refractory purposes. It has also been found that the tendency of such a cast refractory to crack upon cooling or upon rapid temperature change is considerably less than that of refractories in which the alumina is in the alpha form.

We do not know precisely the reason for this resistance to heat shock. It may be attributable to the fact that the average distance between the constituent atoms is greater in beta than in alpha alumina, thus imparting a sort of molecular flexibility; or it may be due to the crystal structure which is found to be characterized by flat interlocking crystals which give exceptional strength to the material. We know that the refractories we have produced in accordance with our invention do not spall as readily as alumina refractories as hitherto produced; and we can see, now that we have made this discovery, that there is a possibility either of these may be an explanation of this property.

Refractories containing a major proportion of beta alumina are useful in the construction of many types of furnaces in the chemical and other industries, whether or not alkali compounds are the principal erosive agent. This is attributable partly to the relatively inert chemical nature of these refractories and partly to their resistance to spalling action. The beta alumina is stable at all temperatures up to its melting point, which is far above the range encountered in any present day industrial furnaces.

The chief advantage of refractories containing a major proportion of beta alumina for use in furnaces of the type above discussed is, however, the remarkable resistance of such refractories to the action of alkali compounds in the molten or vapor state. This property is of importance in connection with all industries where resistance to the action of such corrosive fusions and vapors is desired; but it has been found that these refractories are particularly satisfactory for use in glass tanks where a flux is employed. It gives excellent service below the metal line; but it is at and above the metal line that its value far exceeds that of other materials. We have found our improved refractories to exhibit excellent resistance to the corrosive action of fluoride glass, soda lime glass, and boro-silicate glass.

While we have mentioned the use of this material in the cast form, it is also of great value in the form of bonded refractories, which may be made in much the same way as bonded alumina refractories of the ordinary type. One method, given by way of example, is as follows:

In making bonded refractories of beta alumina the raw mix is fused, as previously described; the pig is then crushed and ground to give grains of suitable sizes such, for instance, as 14 mesh and finer, which particles are then suitably bonded, and fired at proper temperatures. For the bonding material 5 to 20% of levigated alumina, i. e., precipitated alumina made by the Bayer process, is satisfactory. An amount of soda equal to perhaps 5% of the weight of the levigated alumina may be added to cause conversion of the bond to the beta form. Finely powdered previously produced beta alumina may be utilized as a bond. 1600° C. has been found to be a satisfactory temperature for burning such refractories although temperatures considerably higher may be reached without deformation; and burning temperatures as low as 1400° C. may be used, particularly where soda is added to the bond. It is obvious that the crushed header material which is available from the casting of refractory pieces may be used for making bonded refractories.

Ordinary fireclay bonds may of course be used but the refractories produced are inferior in that they are not susceptible to use at the highest temperature ranges and are somewhat more susceptible to alkaline attack.

While we have stated that alkali compounds (those of sodium or potassium) are ordinarily used to bring about the formation of beta alumina, we do not except as specifically noted in the appended claims limit ourselves to these substances since any material which brings about the formation of this form of alumina may be used. While in the foregoing, certain methods of producing our novel refractories have been particularly described, we do not wish to limit ourselves to these described methods except insofar as limitations may be specifically imposed by the following claims.

We claim:

1. A furnace wall comprising refractory material consisting essentially of beta alumina.

2. A glass tank comprising refractories containing a major proportion of beta alumina.

3. In a furnace wall, refractories exposed to hot alkalies, said refractories comprising a major proportion of beta alumina.

4. A refractory article consisting essentially of alumina, a major proportion of the alumina being in beta form.

5. A refractory article consisting essentially of beta alumina.

6. A refractory casting comprising a major proportion of beta alumina.

7. A cast refractory article consisting of the product obtained upon solidification of a fusion of a mixture of high purity alumina with sufficient alkali to cause a substantial proportion of the alumina to form as beta alumina.

8. A refractory article comprising bonded grains of refractory material, said material consisting essentially of beta alumina.

9. As a refractory article, a casting consisting essentially of alumina, a major proportion of the alumina being in beta form.

10. A cast refractory article consisting of the product obtained upon solidification of a fusion of a mixture consisting essentially of alpha alumina and 1 to 10% of sodium oxide.

HENRY H. BLAU.
HENRY N. BAUMANN, JR.